E. J. MUYBRIDGE.
Method and Apparatus for Photographing Objects in Motion.

No. 212,864. Patented Mar. 4, 1879.

Witnesses
D. B. Lawler
I. Saxon Taylor

Inventor
Edward J. Muybridge
per Jno. L. Boone
Attorney

UNITED STATES PATENT OFFICE.

EDWARD J. MUYBRIDGE, OF SAN FRANCISCO, CALIFORNIA.

IMPROVEMENT IN THE METHOD AND APPARATUS FOR PHOTOGRAPHING OBJECTS IN MOTION.

Specification forming part of Letters Patent No. 212,864, dated March 4, 1879; application filed July 11, 1878.

*To all whom it may concern:*

Be it known that I, EDWARD J. MUYBRIDGE, of the city and county of San Francisco, in the State of California, have invented certain Improvements in Photographing Objects in Motion; and I do hereby declare that the following is a full, clear, and exact description thereof, reference being had to the accompanying drawings.

My invention has reference to a novel arrangement for exposing the sensitive plates of photographic cameras, for the purpose of taking instantaneous impressions of objects in motion.

In a cotemporaneous application for a patent filed by me I have described and claimed an arrangement for operating a slide or slides for this purpose by an electric circuit which was established or broken by the object to be photographed as it passed in front of the camera.

My present invention relates to an arrangement whereby the moving object is made to operate the slide simply by mechanical means.

Figure 1:
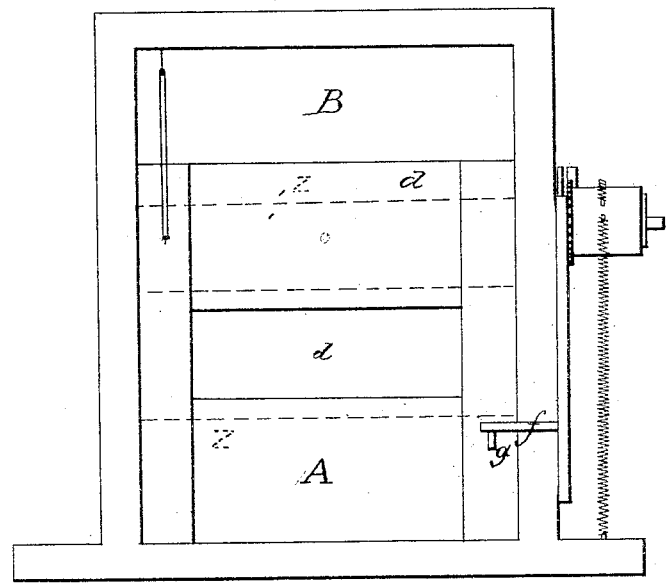
Figure 2:
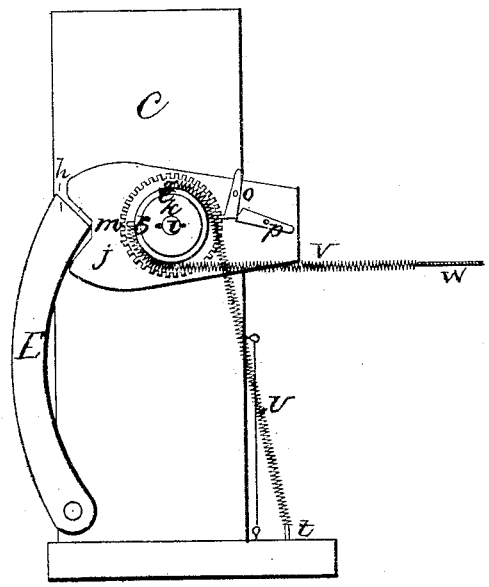

Referring to the accompanying drawings, Figure 1 is a back view of the frame and slides. Fig. 2 is an end view.

A B represent the two parallel slides, which are mounted in a frame, C, and which are provided with the openings $d\ d$, through which the exposure is made when the slides are drawn suddenly in opposite directions, so that the openings pass each other in front of the camera. I have made an improvement in these slides, which consists in arranging a sliding plate, Z, above and another below the opening in each slide, so that I can diminish the width of the openings when desired, and thus obtain a more instantaneous exposure.

E is a lever, which has one end pivoted to the outside of the slide-frame near its bottom, so that it can swing upward into an upright position beside the frame. This lever has an arm, $f$, which extends across the upright side of the frame, so that the set-lever $g$ will catch upon it and form a trigger when the slides are drawn to their set position. The upper end of the lever E is formed with a V-shaped projection or double incline, $h$, on its inner edge, as shown.

A fixed pin or shaft, $i$, projects from the side of the frame opposite the upper end of the lever E, and upon this shaft I place a plate, $j$, and spool or roller K, and secure them on the shaft by a linchpin, so that they can rotate freely. The spool or roller has its inside rim provided with teeth, and the plate $j$ has a pawl, $o$, on one end of it, which can be engaged with the teeth on the roller, and a button, $p$, is arranged to secure the pawl positively in its engagement. The opposite end of the plate $j$ has a V-shaped notch, $m$, in it, in which the V-shaped projection of the lever E enters when the plate is properly adjusted. Two pins or projections, $r\ s$, project from the face of the roller at a short distance apart, as shown.

The slides A B having been drawn in opposite directions and locked by the set-lever $g$, the lever E is thrown to an upright position, so that the extremity of the lever $g$ will be caught lightly under the arm $f$. The plate $j$ is then adjusted so that the V-shaped projection on its end will enter the V-shaped notch in the plate. I then adjust the roller K, so that the pins $r\ s$ are on opposite side of its top, and secure the plate $j$ to the roller by engaging the pawl $o$ with the tooth-rim and locking it. I then connect the pin $r$ on one side of the roller with a hook, $t$, or other device on the base of the frame by a spring, U. I also attach a spring, V, to the pin $s$ on the opposite side of the roller and lead it down under the hook $t$. This latter spring has a cord or thread, attached to it, and this cord or string I stretch across the track along or over which the object to be photographed will move. Both springs U V are strained equally on opposite sides of the roller K, so that the roller is held stationary; but, when the moving object strikes the cord, if the cord is broken, the pressure on that side being relieved, the opposite spring, U, will cause the roller and plate to rotate in an opposite direction, so that the upper inclined edge of the V-notch, acting on the upper inclined projection of the lever E, will force the upper end of the lever outward and unship the trigger, so that the slides are released; but if the force applied to the cord is not sufficient to break it, it will at least increase the tension on that side, so as to cause the roller and plate to rotate sufficiently in that direction to cause the lower inclined edge of the notch to force the upper end of the lever E outward far enough to unship the trigger and release the slides.

By this arrangement, therefore, it is immaterial whether the cord be broken or simply pressed upon by the moving body. In either case the trigger is unshipped and the slides released.

My object in making the plate and roller K separate is to permit me to adjust them with greater nicety and to regulate the tension of the springs more readily. They might, however, be made in one piece, so as to move together. Any kind of a spring or even a weight could be used.

Having thus described my invention, what I claim, and desire to secure by Letters Patent, is—

1. The sliding plates A B, provided with openings, in combination with the supplemental slides Z, arranged above and below said openings, substantially as and for the purpose set forth.

2. The sliding plates A B, with the supplemental slides Z, in combination with a releasing and trigger mechanism and a cord or thread secured thereto for operating the same, substantially as and for the purpose set forth.

3. The improvement in the process of taking instantaneous photographs of objects in motion, which consists in the arrangement of a tripping and releasing mechanism across the track along which the object to be photographed is made to pass, and connecting said mechanism with devices for releasing the shutters in the camera, substantially as described.

In witness whereof I have hereunto set my hand and seal.

E. J. MUYBRIDGE. [L. S.]

Witnesses:
J. SAXON TAYLOR,
D. B. LAWLER.